May 26, 1959 H. R. BURMEISTER 2,887,802
LUGGAGE RACK WITH ILLUMINATED SEAT NUMBERS
Filed Jan. 31, 1956 4 Sheets-Sheet 3
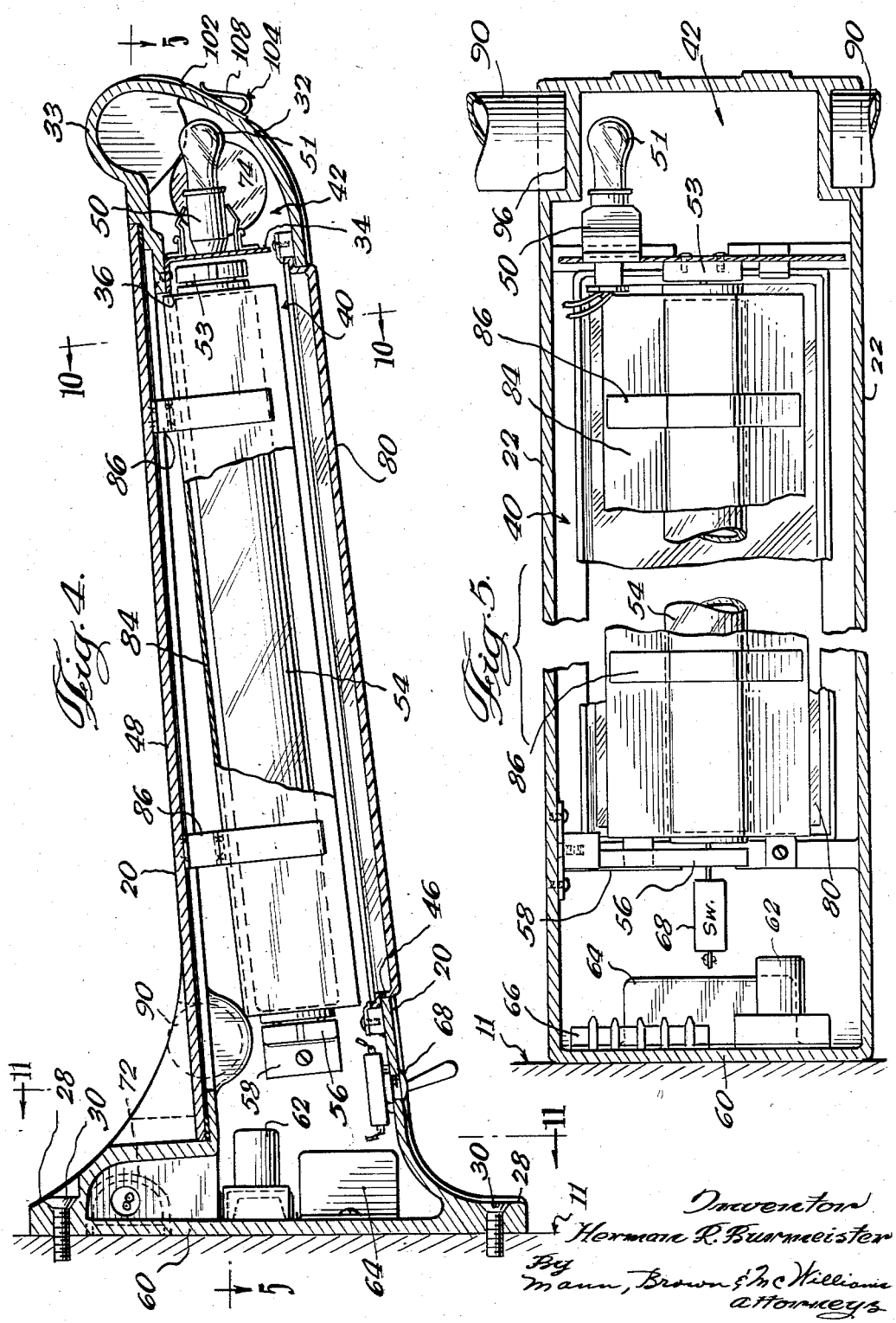
Inventor
Herman R. Burmeister
By
Mann, Brown & McWilliams
attorneys May 26, 1959     H. R. BURMEISTER     2,887,802
LUGGAGE RACK WITH ILLUMINATED SEAT NUMBERS
Filed Jan. 31, 1956     4 Sheets-Sheet 4
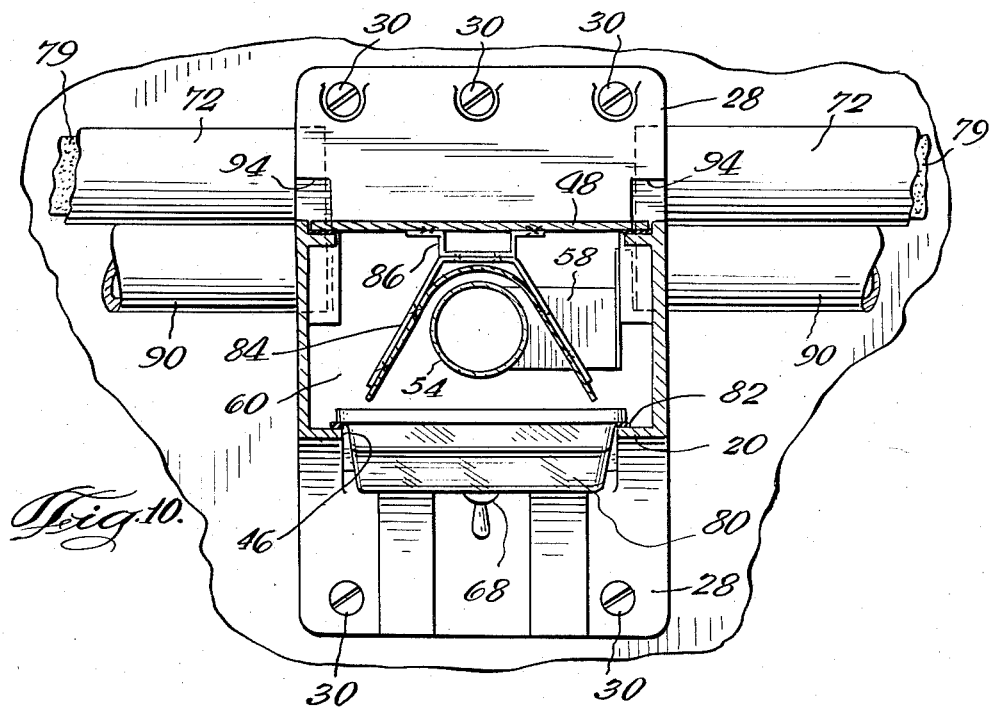
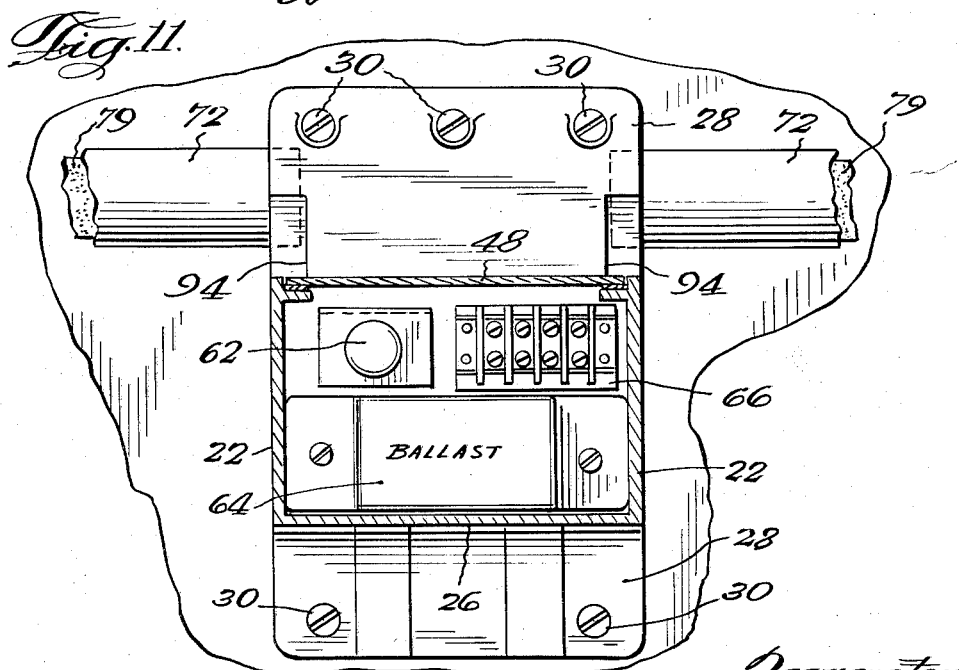
Inventor
Herman R. Burmeister
By Mann, Brown & McWilliams
Attorneys

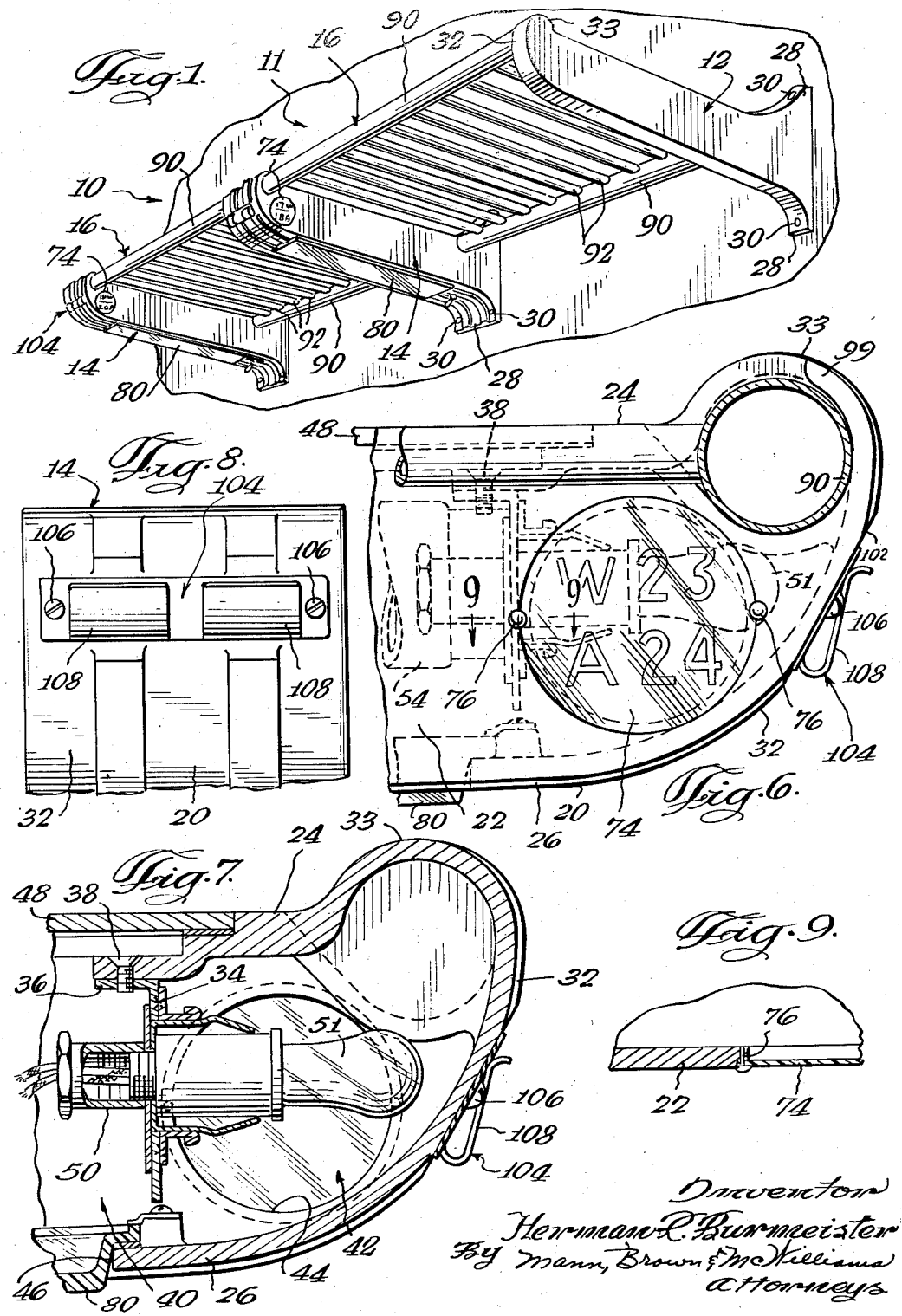

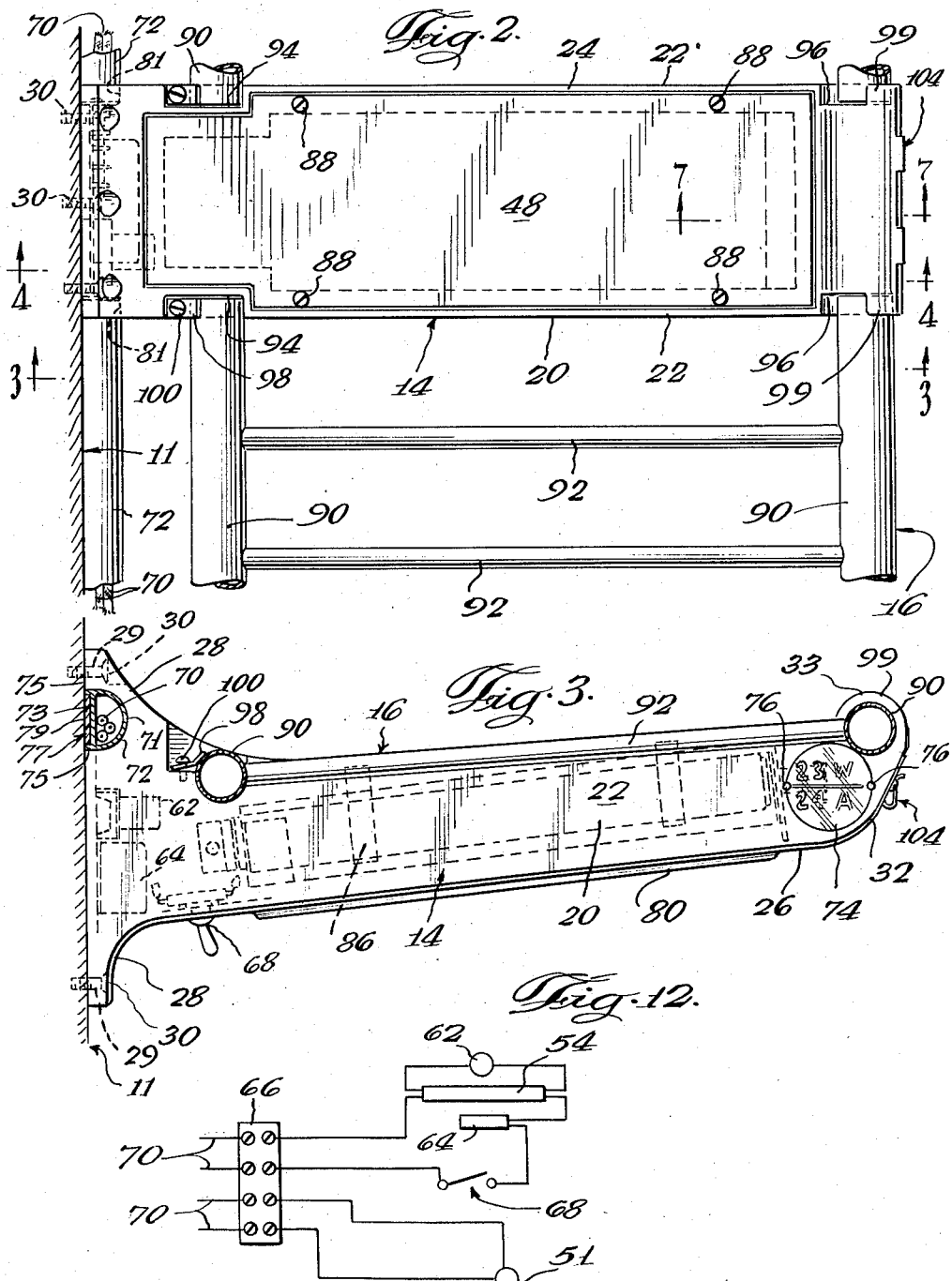

United States Patent Office 2,887,802
Patented May 26, 1959

2,887,802
LUGGAGE RACK WITH ILLUMINATED SEAT NUMBERS

Herman R. Burmeister, Goshen, Ind., assignor to The Adams & Westlake Company, a corporation of Illinois Application January 31, 1956, Serial No. 562,430

2 Claims. (Cl. 40—130)

My invention relates to a luggage rack with illuminated seat numbers, and more particularly, to a luggage rack for railroad cars, buses, airplanes, and the like, which permit one instantly to identify his seat from either end of the vehicle.

Railroad passenger cars, buses, airplanes, and the like commonly include a longitudinally extending aisle that provides access to a plurality of seats arranged in transverse rows along the length of the vehicle. In the case of, for instance, railroad cars, the aisle normally runs down the center of the car, and two seats make up each row on either side of the aisle.

One of the irritations and inconveniences frequently experienced by passengers using these forms of transportation, where seats are reserved, is that the marking of the seats is ambiguous and frequently meaningless. Poor marking of seats causes undue confusion during loading and adds to the burdens of personnel who normally have their hands full in otherwise readying the passengers for travel.

It is a principal object of this invention to provide a luggage rack that includes illuminated seat numbers arranged to permit ready and instant identification from either end of the transportation vehicle.

A further object of the invention is to provide an improved and simplified luggage rack.

Still a further object of the invention is to provide a luggage rack in which both an overhead seat lamp and illuminated seat numbers are incorporated.

Other objects, uses, and advantages will be obvious or become apparent from a consideration of the following description and drawings.

In the drawings:

Figure 1 is a perspective view of a portion of a luggage rack embodying the principles of the present invention and secured to a side wall of a railroad vehicle;

Figure 2 is a top plan view of one of the brackets forming a part of the improved luggage rack together with a portion of one of the luggage supporting grid elements;

Figure 3 is a cross-sectional view along line 3—3 of Figure 2;

Figure 4 is a cross-sectional view along line 4—4 of Figure 2;

Figure 5 is a cross-sectional view along line 5—5 of Figure 4;

Figure 6 is a fragmental side elevational view of the outwardly extending ends of one of the novel brackets comprising the improved luggage rack;

Figure 7 is a cross-sectional view along line 7—7 of Figure 2;

Figure 8 is an end view of one of the novel brackets comprising the improved luggage rack;

Figure 9 is a fragmental cross-sectional view along line 9—9 of Figure 6;

Figure 10 is a cross-sectional view along line 10—10 of Figure 4;

Figure 11 is a cross-sectional view along line 11—11 of Figure 4; and

Figure 12 is a diagrammatic wiring diagram for the lamps mounted in the brackets employed in the improved luggage rack.

Reference numeral 10 of Figure 1 generally indicates a preferred embodiment of the invention secured to the side wall 11 of, for instance, a railroad passenger car. The luggage rack 10 comprises an end bracket 12 and a plurality of spaced apart intermediate brackets 14, it being understood that an end bracket 12 is located at each end of the luggage rack 10. The brackets 14 are preferably positioned directly above each row of seats in the railroad car. Grid or rack means 16 extend between each of the respective brackets 14 and 12, and are supported by them.

Referring to Figures 2 through 7, the brackets 14 in the illustrated embodiment each comprises a hollow body 20 including side walls 22, top wall 24, and bottom wall 26. One end of each bracket 14 is formed with upper and lower flanges 28 formed with holes 29 adapted to receive suitable screws 30 for fixing the bracket to the side wall 11 of the railroad car. The other, or outer end, of each bracket 14 is formed with a rounded upwardly curved outer surface 32 merging into a rounded protuberance or ridge 33.

As seen in Figure 7, transverse partition means comprising an opaque panel 34 is secured to the top wall of each bracket 14. The panel 34 includes laterally extending flange 36 formed to receive screws 38 that secure the panel to the top wall of the bracket. The panel 34 is preferably substantially equal in area to the transverse cross sectional area of the interior of body 20.

The panel 34 divides the hollow interior of each bracket 14 into an elongate chamber 40 and a relatively small outer chamber or sub-chamber 42. The side walls 22 of each body 20 are formed with laterally opening windows 44 (see Figure 7) that open into the smaller chamber 42. The bottom wall 26 of each bracket is formed with a downwardly opening window 46, and top wall 24 of each bracket is substantially eliminated and formed to receive the cover 48.

The panel 34 of each bracket 14 carries a suitable electrical socket 50 (see Figure 7) suitably mounted thereon and adapted to receive a conventional incandescent light bulb 51 positioned in the outer chamber 42. As seen in Figure 5, one end 53 of a conventional fluorescent lamp bulb mounting is also secured to each panel 34, the other mounting 56 being secured to a bracket 58 that is in turn fixed to a side wall 22 of the respective brackets 14. A fluorescent bulb 54 is positioned in these mountings. Each bracket 14 includes a substantially flat end wall 60 at its flanged end, on the inner surface of which are mounted the starter 62 and the ballast 64 that conventionally form a part of a fluorescent lamp circuit. A barrier terminal insulating strip 66 is also secured to the wall 60. A conventional form of toggle switch 68 is mounted in the bottom wall 20 of each bracket 14.

These two lamps 51 and 54 may, by suitable wiring, be connected in a circuit arrangement, such as that schematically illustrated in Figure 12, wherein it is shown that the leads for the separate lamps are independently connected to the barrier strip 66, to which in turn are appropriately secured the ends of wiring 70 mounted in conduits 72 that extend between the respective brackets 14.

As shown in Figure 3, each conduit 72 comprises a generally cylindrical wall 71 integral with a rectilinear wall 73 formed with extensions 75. The wall 73 and extensions 75 form a channel 77, in which a gasket 79 of rubber or the like is secured to each end of the conduits and a suitable form of high pile weatherstripping (not shown) is mounted in each channel 77 in between the respective gaskets 79. The respective ends of conduits 72 are received in appropriately formed holes 81 formed in each side wall 22 of brackets 14. Wiring 70 extends to a suitable source of electrical energy.

Each window 44 is provided with pane means in the form of a plastic disc 74 that, in the illustrated embodiment, is substantially opaque throughout except where the seat numbers appear. The coloring of the disc is arranged to define the indicia in the form of the seat number.

The discs 74 are held in place by, for instance, self tapping screws 76.

A conventional form of glazed pane 80 (see Figure 10) is mounted in the window 46 formed in the bottom wall 20, sealing strip 82 being interposed between inner surfaces of the bracket and the pane if so desired. A reflector element 84 is mounted above the fluorescent tube by brackets 86 that are in turn fixed to the cover 48. The cover 48 is secured in place by screws 88 (see Figure 2).

The grid or rack means 16 each comprises a pair of spaced bars or rods 90 connected together by suitable bars or rods 92. The sides of the brackets 12 and 14 are slotted as at 94 and 96 to receive and support the ends of rods or bars 90. As indicated in Figures 2 and 3, the inner rods or bars 90 may be clamped in place by a clamping device, such as the clamping element 98 that is held against a bar or rod 90 by a screw 100. The abutments 99 formed by slots 96 in brackets 12 and 14 make clamping means at the outer ends of these brackets unnecessary.

The outwardly curved surfaces 32 of the racks 14 are flattened somewhat as at 102 and a ticket holder or clip 104 is fixed where shown, as by suitable screws 106. Referring to Figures 6 and 8, the holder or clip 104 comprises a one piece element of substantial resiliency formed with a pair of looped tongues or appendages 108 that bear against the main body of the holder or clip.

The brackets 12 are shaped similarly to brackets 14, but are relatively flat. They are secured to wall 11 in the same manner as brackets 14.

As indicated hereinbefore, the individual brackets 14 are to be mounted directly over individual rows of seats, while the brackets 12 are positioned rearwardly and forwardly of the rows of seats. After the brackets are mounted in position, the individual grid or rack means 16 may be dropped into place in slots 94 and 96 and the clamps applied. The discs 74 of the individual windows 44 are to be appropriately marked with the number of the seat and the letters "A" and "W" to indicate whether the seat is adjacent the aisle or adjacent the side wall of the railroad car. By making the opaque portion of discs 74, for instance, black in color and the indicia indicating portions thereof white or translucent, passengers can instantly identify their seat from either end of the car. The lamps 51 would remain constantly illuminated while the car is in use, while lamps 54 may be turned on at the option of the passenger by operating switch 68.

The clip 104 provides a convenient place for conductors or other personnel in charge to place passengers ticket stubs.

It will be appreciated that my rack is safe and sturdy and built to take much abuse and heavy loads. The brackets 12 and 14 are preferably cast aluminum finished to provide an attractive appearance. The bars or rods 90 and 92 and conduits 72 are extruded aluminum tubing. However, it will be appreciated that the various elements of the invention may be formed from other materials having the desired characteristics.

It may also be noted that conduits 72 are held in position by brackets 12 and 14, so that the only screw holes required in the car wall are those for screws 30.

The foregoing description and the drawings are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. In a luggage rack for railroad passenger cars and the like of the type having a longitudinally extending aisle and transversely extending rows of seats along the aisle, said rack being secured to the vehicle side wall above the seats on that side of the vehicle and including a plurality of spaced brackets, with one of the brackets positioned above each row of seats along said vehicle side wall, said brackets each being secured at one end thereof to the side wall of the vehicle and comprising an elongate hollow body that extends crosswise of the aisle and includes a downwardly opening window and illuminating means directed through said window, and generally vertical side walls that extend generally normally of the aisle, the improvement wherein an opaque panel is mounted in the respective brackets adjacent to but spaced from the other end thereof, said panel of each bracket extending transversely of the bracket and being proportioned to extend substantially across the transverse cross-section of the interior of the bracket, said body and said panel defining a subchamber in said bracket; wherein a window opening into said subchamber is formed in each bracket side wall; wherein pane means is mounted in each of said window openings, said pane means including opaque means defining seat number indicia of the seats above which the respective brackets are positioned; and including illuminating means mounted in said subchamber.

2. In a luggage rack bracket, for railroad passenger cars and the like of the type having a longitudinally extending aisle leading from the vehicle entrance way and transversely extending rows of seats along the aisle, said bracket including an elongate hollow body adapted to be secured at one end thereof to the side wall of the vehicle to position the body crosswise of the aisle above one of the rows of seats, said body being formed with a downwardly opening window and carrying illuminating means directed therethrough, said body further including a generally vertical side wall at the other end thereof that extends generally perpendicular to the aisle and faces said entrance way, the improvement wherein an opaque panel is mounted in the body adjacent to but spaced from said other end thereof, said panel extending transversely of the body and being proportioned to extend substantially across the transverse cross section of the interior of the body, said body and said panel defining a subchamber in said bracket; wherein a window opening into said subchamber is formed in said body side wall; wherein pane means is mounted in said window opening, said pane means including opaque means defining seat member indicia of the seats above which the bracket is positioned; and including illuminating means mounted in said subchamber.

References Cited in the file of this patent

UNITED STATES PATENTS

| | | |
|---|---|---|
| 1,420,059 | Roth | June 20, 1922 |
| 1,730,241 | Porter | Oct. 1, 1929 |
| 2,217,688 | Larson | Oct. 15, 1940 |
| 2,639,817 | Ehret | May 26, 1953 |